(12) United States Patent
Gabas

(10) Patent No.: US 6,305,238 B1
(45) Date of Patent: Oct. 23, 2001

(54) CONNECTING UNIT

(75) Inventor: Carlos Gabas, Barcelona (ES)

(73) Assignee: Fico Cables S.A., Rubi (ES)

( * ) Notice: Subject to any disclaimer, the term of this patent is extended or adjusted under 35 U.S.C. 154(b) by 0 days.

(21) Appl. No.: 09/443,668

(22) Filed: Nov. 19, 1999

(30) Foreign Application Priority Data

Dec. 20, 1998 (DE) .............................. 198 53 656

(51) Int. Cl.⁷ ...................................... F16C 1/14
(52) U.S. Cl. ............................. 74/502.6; 403/13
(58) Field of Search ................... 74/500.5, 501.5 R, 74/502, 502.2–502.4, 502.6, 512, 527; 403/13, 14

(56) References Cited

U.S. PATENT DOCUMENTS

| | | | |
|---|---|---|---|
| 4,205,735 | * 6/1980 | Murray | 188/16 |
| 4,448,436 | * 5/1984 | Ohzono | 280/282 |
| 4,524,632 | * 6/1985 | Ballard | 74/502 |
| 4,548,093 | * 10/1985 | Nomura et al. | 74/512 |
| 4,785,683 | * 11/1988 | Buckley et al. | 74/502.2 |
| 4,914,971 | * 4/1990 | Hinkens et al. | 74/502.2 |
| 5,203,068 | * 4/1993 | Siring | 74/501.5 R |
| 5,829,314 | * 11/1998 | Scura | 74/500.5 |
| 5,927,895 | * 7/1999 | Watanabe | 74/502.6 |
| 6,098,486 | * 8/2000 | Liao | 74/500.5 |

FOREIGN PATENT DOCUMENTS

| | | |
|---|---|---|
| 38 33 280 | 4/1989 | (DE) . |
| 195 46 931 | 2/1997 | (DE) . |
| 197 34 864 | 8/1998 | (DE) . |
| 0 311 346 | 10/1988 | (EP) . |
| 0 857 881 | 8/1998 | (EP) . |

* cited by examiner

Primary Examiner—David A. Bucci
Assistant Examiner—Chong H. Kim
(74) Attorney, Agent, or Firm—Renner, Otto, Boisselle & Sklar LLP

(57) ABSTRACT

The present invention relates to a connecting unit for the transmission of pulling movements to one end of at least one bowden cable, in particular for a parking brake of a vehicle. The present invention further relates to a method for establishing a connection between a bowden cable and a pulling element for the transmission of pulling movements, as it is preferably used during the assembly of parking brakes in vehicles.

Figure 1:
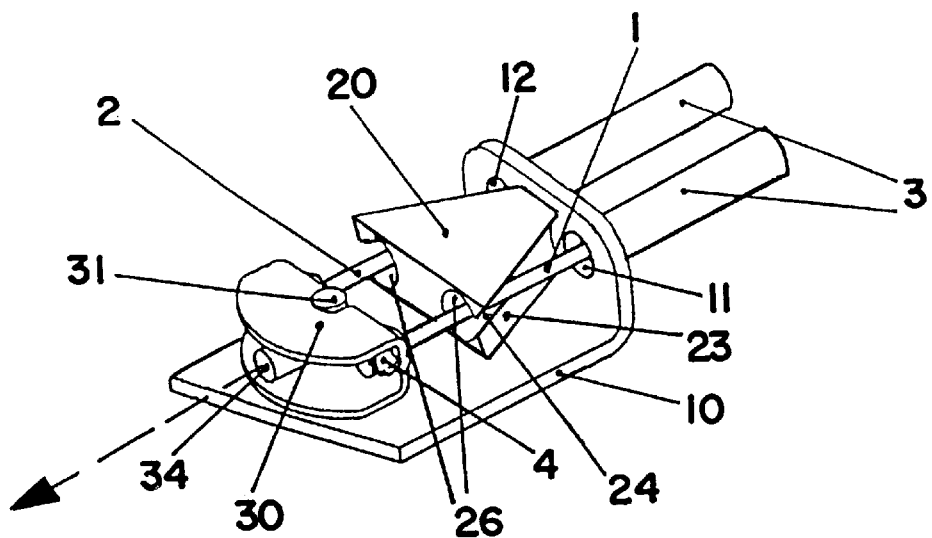

The connecting unit comprises a support with at least one opening for the mounting of the connecting unit, a pulling element with at least one receptacle for the end of the at least one bowden cable and a guiding element, where the end of the at least one bowden cable can engage the receptacle, and the guiding element is arranged between the at least one opening of the support and the at least one receptacle. The guiding element deflects the end of the at least one bowden cable under a movement in direction of the receptacle through the at least one opening of the support to the side to engage the receptacle.

14 Claims, 3 Drawing Sheets

CONNECTING UNIT

1. TECHNICAL FIELD

The present invention relates to a connecting unit for the transmitting of pulling movements to at least one bowden cable, in particular for a parking brake of a vehicle. The present invention further relates to a method for establishing a connection between a bowden cable and a pulling element for the transmitting of pulling movements, as it is preferably used during the assembly of parking brakes in vehicles.

2. THE PRIOR ART

Bowden cables serve in many fields of technology for transmitting movements from one place to another. In motor vehicles for example the transmission is often controlled by a shift lever whose movements are transmitted by means of one or more bowden cables. A further typical field of use for bowden cables is the parking brake of a car. In this case the movement of a lever is transmitted by two bowden cables to the brakes usually mounted to the two rear wheels to achieve a simultaneous operation of the two brakes.

For transmitting the pulling movements to a bowden cable a thickening is arranged at the end of the steel cable typically used for bowden cables. The receptacle for the bowden cable, for example of a brake lever, usually comprises a small hole through which the cable extends. The diameter of the hole is such that the cable, but not the thickening at the end of the cable, can fit through the hole. When the receptacle moves into a direction opposite to the direction into which the cable extends, a pulling movement is transmitted to the cable.

This kind of connection between receptacle and cable according to the prior art causes during the assembly of bowden cables, in particular in the automotive field a considerable amount of work since the cable has to be manually passed through the small hole in the receptacle before the other end can be connected with the desired part (transmission, brake, etc.). The difficulties caused thereby are to be further explained in the following with reference to the example of a parking brake in a car as it is for example shown in the DE 195 46 931:

When a parking brake is assembled, the two braking cables for the simultaneous operation of the two brakes are to be mounted to a so-called equalizer compensating a different wear of the brake linings and/or small differences in the length of the two cables. The equalizer is via a further single braking cable connected to the brake lever. In order to avoid the accumulation of dirt or corrosion such an equalizer can be arranged inside a housing.

During assembly at first the two braking cables have to be manually arranged in the corresponding receptacles of the equalizer before the housing can be mounted. The overall procedure therefore requires several manual steps and thus causes considerable costs. Further, it is necessary that the equalizer and the ends of the braking cables can be easily accessed and seen from the outside. Depending on the location where the equalizer is arranged, it will during assembly be necessary to rotate and/or lift the complete car to allow an easy access and view of the equalizer and the two braking cables.

Further, general concepts for the connection of a single bowden cable and a lever are disclosed in the EP 0 311 346 and the EP 0 857 881.

It is therefore the problem of the present invention to provide a connecting unit for the transmission of pulling movements to one or several bowden cables which can be assembled in a simple step, i.e. the connection between the end of the bowden cable and a corresponding receptacle can be achieved without having to access or to see the connecting unit.

According to a further aspect, it is the problem of the present invention to provide a simple and easy method for connecting a pulling element and a bowden cable for the transmission of pulling movements to the bowden cable.

3. SUMMARY OF THE INVENTION

These problems are solved by a connecting unit for transmitting of pulling movements to an end of at least one bowden cable, comprising: a support for mounting the connecting unit and having at least one opening; a pulling element with at least one receptacle for receiving and engaging an enlarged end of the one bowden cable; and a guiding element separate from and movable relative to the support and pulling element, the guiding element being arranged between the one opening of the support and the one receptacle such that upon insertion of the one bowden cable through the one opening in the direction of the one receptacle, the guiding element will cause the enlarged end of the one bowden cable to be laterally deflected for passage to a position beyond the one receptacle that enables the enlarged end of the one bowden cable to move into and engage the one receptacle; and by a method for establishing a connection between at least one bowden cable and a pulling element for the transmission of pulling movements from the pulling element to the one bowden cable, the method comprising the steps of: moving an enlarged end of the one bowden cable in the direction of a receptacle in the pulling element; causing the enlarged end of the one bowden cable to be laterally deflected by a guiding element during the movement of the enlarged end in the direction of the receptacle and thereby resiliently bending the one bowden cable, the guiding element being separate from and movable relative to the pulling element; and allowing the bowden cable to resiliently spring-back for movement of the enlarged end of the one bowden cable into engagement with the receptacle.

In the connecting unit according to the invention the cable is not inserted from the front side but slides, coming from the back side, preferably sideways through a slit into the receptacle. This is achieved by the sideways deflection of the end of the cable by the guiding element, leading to an elastic bending of the cable which causes the cable to spring back into the slit of the receptacle once it has passed the guiding element.

As a result, the bowden cable can "automatically" engage the receptacle in one step by a simple pushing of the end through the opening in the support in the direction of the receptacle. Since the guiding element itself inserts the end of the bowden cable under such a movement into the slit, the complete procedure can be carried out "blind", i.e. without the need to be able to see the connecting unit from the outside. The end of the braking cable in the direction of the receptacle can also be moved by pushing at the other end of the bowden cable so that there is no need to directly access the connecting unit. The complete connecting unit can therefore be arranged inside a closed housing which does not need to be opened for the assembly of the bowden cable. This allows a pre-assembly to a great extent which considerably shortens the time for the assembly of a vehicle at the assembly line.

According to a preferred embodiment the guiding element comprises a groove-like guiding surface for deflecting the end of the at least one bowden cable. By this shape of the guiding surface it is assured that the end of the bowden cable is reliably deflected by the guiding element. Preferably, the groove-like guiding surface comprises a slit-like recess, in which the at least one cable extends after the end of the cable has engaged the at least one receptacle.

In a particularly preferred embodiment the pulling element comprises a second receptacle with a slit and a second bowden cable extends essentially parallel to the first bowden cable through a second opening in the support where the guiding element deflects one end of the second bowden cable under a movement in the direction of the second receptacle so that it is inserted into the slit of the second receptacle.

For the use in a parking brake of a vehicle the pulling element is preferably provided as an equalizer and the two bowden cables as braking cables. The equalizer preferably contacts in the disengaged state of the parking brake the front side of the guiding element.

Preferably, the two receptacles for the two braking cables are shaped as essentially hemispherical recesses in the equalizer, which are arranged in corresponding recesses of the front side of the guiding element, when the brake is disengaged. Thus, the positions of these two parts with respect to each other are fixed.

The subject matter of the dependent claims are further preferred embodiments of the connecting unit according to the invention.

According to a further aspect, the invention relates to a method for establishing a connection between at least one bowden cable and a pulling element for transmitting pulling movements from the pulling element to the at least one bowden cable where the method comprises the steps of moving the end of the at least one bowden cable in the direction of a receptacle in the pulling element, deflection of the end of the bowden cable from the direction of movement by a guiding element under the elastical bending of the bowden cable and elastical spring-back of the end of the at least one bowden cable into the receptacle through a slit in the receptacle.

4. SHORT DESCRIPTION OF THE DRAWING

Figure 2:
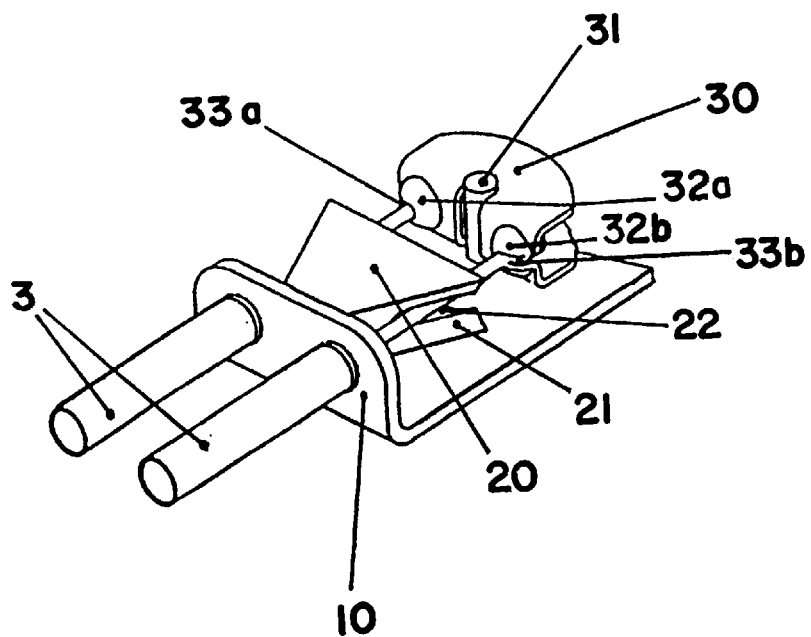
Figure 3:
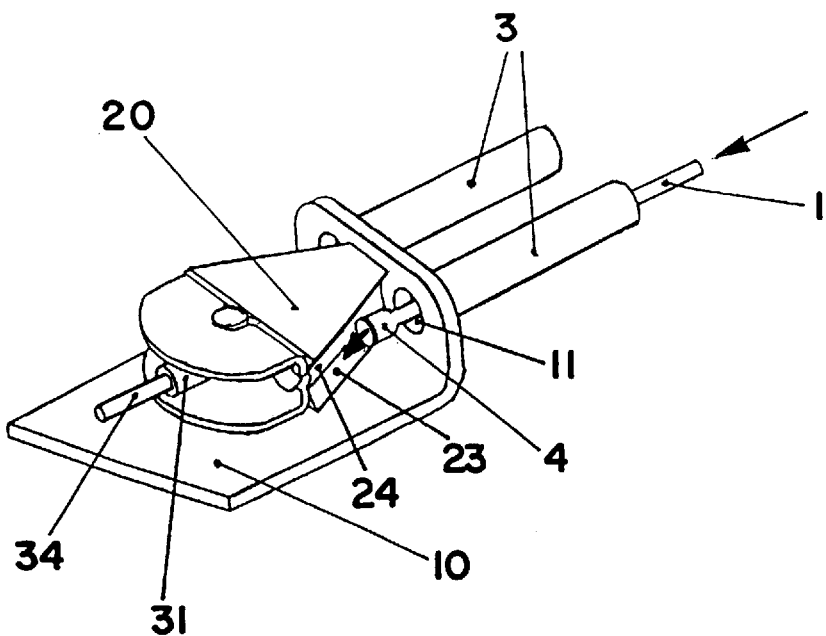
Figure 4:
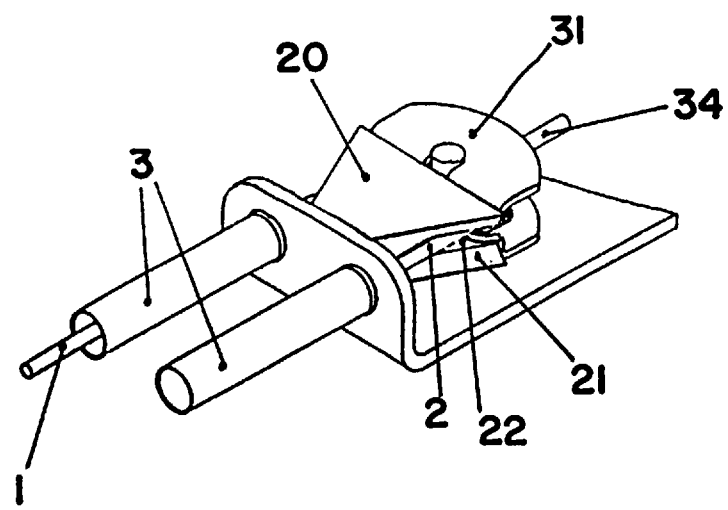
Figure 5:
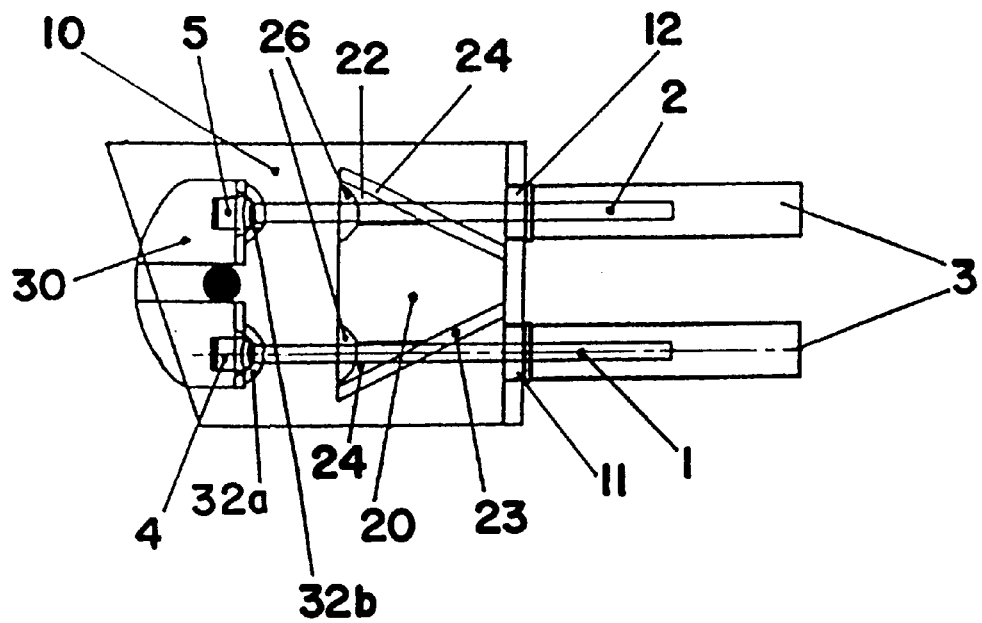
Figure 6:
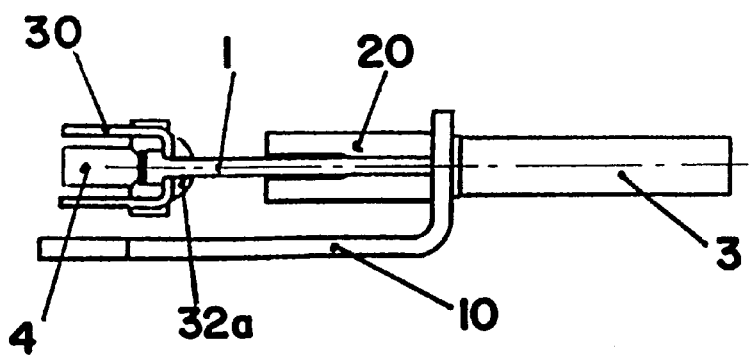

In the following detailed description a presently preferred embodiment of the present invention is shown with reference to the drawing which shows:

FIG. 1: A perspective front view of a preferred embodiment of the connecting unit according to the invention in the assembled state;

FIG. 2: A perspective rearview of the connecting unit of FIG. 1;

FIG. 3: A perspective view of the connecting unit during assembly of bowden cable 1;

FIG. 4: A perspective rearview of the connecting unit of FIG. 1 in the assembled state with a disengaged parking brake;

FIG. 5: A top view of the connecting unit of FIG. 1;

FIG. 6: A side view of the connecting unit of FIG. 1.

5. DETAILED DESCRIPTION OF THE INVENTION

The particularly preferred embodiment of the invention described in the following is used as a part of a parking brake system of a vehicle.

However, it has to be understood that the invention can be used wherever a pulling movement is to be transmitted to one or several bowden cables.

With reference to FIG. 1 the connecting unit comprises a support 10 having a horizontal and vertical section (cf. FIG. 6). The support serves preferably for mounting the connecting unit to the vehicle. To this end several further (not shown) borings can be provided for mounting screws or the like. Conceivable is also to glue the support to the frame of the vehicle.

As a protection against dirt and/or corrosion the complete connecting unit can be arranged inside a housing (not shown) having on its one side an opening for the cable 34 and on the other side two openings for the two cables 1, 2. If needed, the support 10 can be an integral part of the housing.

In the vertical section of the support preferably two circular openings 11, 12 are arranged through which the two cables 1, 2 extend. Via these two cables the brakes usually arranged at the rear wheels of the vehicle (not shown) are operated. At the rear side of the support 10 the outer sheath of the cables can be mounted (not shown), directly or via two tubes 3.

The cables comprise at their respective front ends thickenings 4, 5 which are arranged in corresponding hemispherical receptacles 32a, 32b when the connecting unit is assembled (cf. FIG. 2). The hemispherical receptacles are part of an equalizer 30. They comprise each an outwardly to the side directed slit 32a, 32b. If the complete equalizer 30 is forwardly pulled (dashed arrow in FIG. 1), by means of the further bowden cable 34 (cf. FIG. 3) connected to the lever of the parking brake (not shown) this pulling movement is simultaneously transmitted to the two cables 1, 2.

Since the cable 34 is attached to the equalizer 30 by means of a tee 31, the relative position of the two receptacles 32a, 32b with respect to the pulling direction can be changed by a rotation around the vertical part of the tee to compensate different lengths of the cables 1 or 2 or different wear of the brake linings of the two brakes (not shown). Thus it is assured, that both rear wheels are braked with the same force. Since the functioning of an equalizer is well-known to a person skilled in the art, it is not further discussed in the following.

Between the rear side of the equalizer 30 and the vertical section of the support 10 the guiding element 20 is according to the invention arranged. As can be seen in particular in the top view of FIG. 5 this part has essentially the shape of an obtuse triangle where the "tip" contacts the vertical section of the support 10 between the two openings 11 and 12. The opposite front side is directed to the rear side of the equalizer 30. When the parking brake is disengaged, the rear side of the equalizer 30 directly contacts the front side of the guiding element 20 (cf. FIGS. 3, 4).

As can be derived from FIGS. 1 to 4 the two sides of the guiding elements 20 comprise each preferably a guiding surface 23, 21 shaped like a groove. In the sections of the guiding surfaces 23, 21 directed to the equalizer 30 preferably slit-like recesses 22, 24 are provided in the groove-like guiding surfaces 23, 21 extending in the direction of the respective cable 1 or 2.

By means of the connecting unit according to the invention it is during assembly, as explained in the following, possible by means of simple pushing at the rear ends (not shown) of the two cables 1, 2 to arrange the two thickenings 4, 5 in the corresponding receptacles 32a, 32b of the equalizer 30:

To this end the thickenings 4, 5 are pushed at the ends of the cables 1, 2 (either simultaneously or one after the other) from behind through the openings 11, 12. FIG. 3 shows the situation when the end of the cable 1 has just passed the opening 11. Under a further movement of the thickening 4 it hits the inclined guiding surface 23 which deflects it from its original direction of movement (cf. small black arrow in FIG. 3). Due to this deflection the cable 1 is elastically bent.

Under a further movement the thickening 4 slides along the groove-like guiding surface 23. Due to the preferred grooved shape of the guiding surface 23 a sliding of the thickening 4 from the guiding surface 23 in a downward or upward direction is avoided.

During assembly the brake lever is in the position of a disengaged brake so that, as already mentioned, the rear side of the equalizer 30 directly contacts the front side of the guiding element 20 (cf. FIG. 3).

Therefore, when the thickening has passed the front side of the guiding element 20 it is introduced by the springy force of the cable 1 into the slit 33a on the side of the receptacle 32a. In this situation the cable 1 extends in the slit-like recess 24 of the guiding groove 23 (cf. FIGS. 1, 2 and 4, 5). By pushing from its rear end the thickening 5 of the cable 2 is in the same way introduced into the receptacle 32b. When the braking lever is now operated, the pulling movement of the equalizer 30 is transmitted to the two cables 1, 2.

The connecting unit according to the invention and the method according to the invention allow to arrange the front ends of the cables 1 and 2 in the corresponding receptacles 32a, 32b by a simple pushing at their respective rear ends without the need of a direct access and/or view of the connecting unit.

Preferably, the two receptacles 32a, 32b in the equalizer 30 are hemispherically shaped (cf. FIG. 2) to provide a better rest for the thickenings 4,5. In this case a short pulling movement is necessary subsequent to the pushing movement at the rear end of each cable 1, 2 to secure the thickenings 4, 5 in the hemispherical recesses of the receptacles 32a, 32b.

Preferably, circular recesses 26 are provided on the front side of the guiding element 20 (cf. FIGS. 1 and 5) in which the mentioned hemispherical recesses 32 of the equalizer 30 are arranged, when the brake is disengaged, whereby the relative position of the equalizer 30 and the guiding element 20 are fixed.

It is to be understood that by providing several guiding surfaces at the guiding element 20 also other numbers of cables can be connected with corresponding receptacles. Further, it is clear that with a single guiding surface and the corresponding receptacle a connecting unit according to the invention can be provided for a single bowden cable. Finally, a person skilled in the art understands that the present invention can also be used in other fields (for example ship building, for the operation of the rudder) than the automotive field.

Apart from the cables 1 and 2 which are preferably made out of steel cables, plastic materials like Polyamide No. 6 or different metal alloys are used. For the equalizer and the support which are subjected to the greatest mechanical stress preferably metal is used whereas the guiding element is preferably produced by injection molding of a plastic material to reduce the weight and costs.

What is claimed is:

1. A connecting unit for transmitting of pulling movements to an end of at least one bowden cable, comprising:
    a support for mounting the connecting unit and having at least one opening;
    a pulling element with at least one receptacle for receiving and engaging an enlarged end of the one bowden cable; and
    a guiding element separate from and movable relative to the pulling element, the guiding element being arranged between the one opening of the support and the one receptacle such that upon insertion of the one bowden cable through the one opening in the direction of the one receptacle, the guiding element will cause the enlarged end of the one bowden cable to be laterally deflected for passage to a position beyond the one receptacle that enables the enlarged end of the one bowden cable to move into and engage the one receptacle.

2. A connecting unit according to claim 1, wherein the one receptacle includes a slit opening to a side of the pulling element for passage of the one bowden cable, thereby allowing the enlarged end of the one bowden cable to move into engagement with the one receptacle.

3. A connecting unit according to claim 1, wherein the guiding element has a groove-like guiding surface for guiding and causing the enlarged end of the one bowden cable to deflect laterally upon insertion of the one bowden cable through the one opening in the direction of the one receptacle.

4. A connecting unit according to claim 3, wherein the groove-like guiding surface of the guiding element has a slit-like recess through which the one bowden cable extends after the enlarged end has engaged the one receptacle of the pulling element.

5. A connecting unit according to claim 1, wherein the support includes a second opening, the pulling element includes a second receptacle for receiving and engaging an enlarged end of a second bowden cable, and the guiding element is arranged between the second opening of the support and the second receptacle such that upon insertion of the second bowden cable through the second opening in the direction of the second receptacle, the guiding element will cause the enlarged end of the second bowden cable to be laterally deflected for passage to a position beyond the second receptacle that enables the enlarged end of the second bowden cable to move into and engage the second receptacle.

6. A connecting unit according to claim 5, wherein the guiding element has first and second groove-like guiding surfaces for guiding and causing the enlarged end of the one and second bowden cables to deflect laterally upon insertion of the one and second bowden cables through the one and second openings in the direction of the one and second receptacles, respectively, and wherein the first and second groove-like guiding surfaces of the guiding element each has a slit-like recess through which the respective bowden cable extends after the enlarged end thereof has engaged the respective receptacle of the pulling element.

7. A connecting unit according to claim 6, wherein the groove-like guiding surfaces for the one and second bowden cables are arranged on opposite sides of the guiding element.

8. A connecting unit according to claim 7, in combination with the one and second bowden cables, the one and second bowden cables being configured for use as brake cables for a parking brake of a vehicle, and the pulling element being operative as an equalizer between the one and second bowden cables.

9. A combination of first and second bowden cables configured for use as brake cables for a parking brake of a vehicle, and a connecting unit for transmitting of pulling movements to an end of the first and second bowden cables, comprising:
    a support for mounting the connecting unit and having a first and second opening;

a pulling element with first and second receptacles respectively for receiving and engaging enlarged ends of the first and second bowden cables; and a guiding element arranged between the first and second openings of the support and the first and second receptacles such that upon insertion of the first and second bowden cables respectively through the first and second openings in the direction of the first and second receptacles, the guiding element will cause the enlarged ends of the first and second bowden cables to be laterally deflected for passage to a position beyond the first and second receptacles that enables the enlarged ends of the first and second bowden cables to move into and engage the first and second receptacles, respectively, and wherein the guiding element has first and second groove-like guiding surfaces on opposite sides thereof for guiding and causing the enlarged ends of the first and second bowden cables to deflect laterally upon insertion of the first and second bowden cables through the first and second openings in the direction of the first and second receptacle, respectively, and wherein the first and second groove-like guiding surfaces of the guiding element each has a slit-like recess through which the respective bowden cable extends after the enlarged end thereof has engaged the respective receptacle of the pulling element, wherein the pulling element being operative as an equalizer between the one and second bowden cables, and wherein tension on the one and second bowden cables will move the pulling element into engagement with the guiding element, as when the parking brake is disengaged.

10. A connecting unit according to claim 9 where the one and second receptacles for the two braking cables are provided essentially hemispherical bosses in the pulling element which are disposed in circular recesses of the guiding element when the pulling element is engaged with the guiding element.

11. A parking brake in a vehicle, wherein movement of a braking lever is transmitted to at least one of the one and second bowden cables of the connecting unit according to claim 8.

12. A method for establishing a connection between at least one bowden cable and a pulling element for the transmission of pulling movements from the pulling element to the one bowden cable, the method comprising the steps of:

a. moving an enlarged end of the one bowden cable in the direction of a receptacle in the pulling element;

b. causing the enlarged end of the one bowden cable to be laterally deflected by a guiding element during the movement of the enlarged end in the direction of the receptacle and thereby resiliently bending the one bowden cable, the guiding element being separate from and movable relative to the pulling element; and c. allowing the bowden cable to resiliently spring-back for movement of the enlarged end of the one bowden cable into engagement with the receptacle.

13. A method according to claim 12, wherein the receptacle is formed by an essentially hemispherically shaped boss in the pulling element and where the method comprises after step c the further step of backwards pulling the enlarged end of the one bowden cable for secure engagement of the enlarged end in the receptacle.

14. A connecting unit according to claim 7, wherein the groove-like guiding surfaces for the one and second bowden cables open outwardly in opposite directions.

* * * * *